United States Patent [19]

Capan

[11] Patent Number: 5,222,010
[45] Date of Patent: Jun. 22, 1993

[54] RAILWAY TRACK CIRCUIT SURGE SUPPRESSION SYSTEM

[75] Inventor: Ronald R. Capan, Pittsburgh, Pa.

[73] Assignee: Union Switch & Signal Inc., Pittsburgh, Pa.

[21] Appl. No.: 824,010

[22] Filed: Jan. 22, 1992

[51] Int. Cl.$^5$ .............................................. H02H 9/04
[52] U.S. Cl. ........................................ 361/56; 361/58; 361/111; 361/127
[58] Field of Search ................. 361/56, 57, 58, 91, 361/111, 126, 127

[56] References Cited

U.S. PATENT DOCUMENTS 4,237,515 3/1988 Pierce, Jr. ............................ 361/127
4,237,516 3/1988 Pierce, Jr. ............................ 361/127

OTHER PUBLICATIONS

"USSP Secondary Surge Suppressors", Union Switch & Signal, pp. 1-4, Mar. 1983.
A catalog entitled "The Signal Shop", p. 75, Jan. 1990.

Primary Examiner—Todd E. DeBoer
Attorney, Agent, or Firm—Buchanan Ingersoll

[57] ABSTRACT

A railway track circuit surge suppression system for the protection of wayside equipment from transitory energy surges appearing in the rails. The system has a primary surge suppression stage typically near the rails and a secondary surge suppression stage typically near the equipment to be protected. The secondary stage comprises an apparatus having a pair of inductors arranged serially with the respective track line wires to oppose the flow of surging current. Thus, the much of the energy dissipates at the primary stage. Remaining energy is dissipated by a voltage clamp behind the inductors.

3 Claims, 4 Drawing Sheets

RAILWAY TRACK CIRCUIT SURGE SUPPRESSION SYSTEM

BACKGROUND OF THE INVENTION

1. Field of the Invention

This invention relates to railway track circuit energy surge suppressors.

2. Description of the Prior Art

Movement of a railway vehicle along a railroad is necessarily limited to one degree of freedom. That is to say, the vehicle can only travel back and forth along the track. It cannot alter its course to avoid other traffic. In order to prevent railway vehicles on the same track from overtaking each other, a block signalling system has been devised whereby the track is divided into segments, or "blocks," of a length greater than the stopping distance of a train. In order to prevent a problem, only one train is allowed in a particular block at a time. Wayside block indicators positioned before an upcoming block indicate to the locomotive engineer whether or not the block is occupied. If so, the engineer will know to adjust the speed of the train.

The operation of wayside block indicators has been traditionally controlled by the track circuit. The track circuit is essentially an electrical circuit in which the rails in a block complete a connection between an electrical signal transmitter and an electrical signal receiver. Insulating joints may be placed between adjacent blocks to provide electrical separation. When the block is unoccupied, current is allowed to flow through the rails to the receiver. Typically, the receiver acts as a switch to activate the wayside indicators to display an appropriate aspect. If, however, the block is occupied by any part of a train, shunt paths are created by the presence of a wheel and axle set of the train. Thus, current is prevented from reaching the receiver. As such, the wayside indicator will not be activated and will give a stop signal, or simply no signal at all.

In order to make the most efficient use of a track, it is desirable to have a minimum space in excess of stopping distance between adjacent trains. Minimum train spacing is accomplished using an aspect scheme wherein a number of different wayside indicator aspects are displayed. Each aspect represents a condition of operation to which the locomotive engineer should adhere. Examples of such conditions are stop, approach, approach medium, advance approach, and clear.

In order to display a particular aspect, an electrical signal is pulse modulated or otherwise encoded with an appropriate code into the rails by the transmitter. The receiver, which was originally merely a series of relays, interprets the logic of the coded track signal to display the aspect. The track circuit is what is known in the art as a vital circuit. A vital circuit is one in which a malfunction of one of the circuit components cannot give an unsafe condition. Thus, the vital circuit relays were typically very large devices constructed to exacting standards. They had special non-welding contacts to resist sticking when exposed to large current surges, such as by lightning. Because these relays tended to be expensive and slow, however, advances in technology made it desirable to replace them with electronic circuits. The circuits, however, are smaller than the relays, and are more easily damaged by transitory energy surges such as a current surge caused by lightning.

The frequency of lightning surge damage to track circuit equipment depends on a number of factors. First, lightning is a seasonal occurrence. Thus, while lightning is fairly common in the warmer months, it is rarely seen in winter. Additionally, the direction of a lightning storm will effect surge occurrence. For example, a storm passing over a track in a perpendicular direction will have a relatively low probability of causing surge damage. However, a storm moving parallel to the track could strike several consecutive blocks, causing damage in each. This uncertain nature of lightning surge introduces significant logistical and personnel problems into repairing surge damage. Thus, a number of surge suppression devices have appeared in the prior art.

Prior art surge suppression systems have generally comprised an arrester set having three varistor-filled-gap arresters. Two of the arresters are connected line-to-ground and the other is connected line-to-line across the track wires. Sometimes, a secondary stage suppressor has been utilized to supplement the primary arrester set. The secondary stage suppressors, when utilized, are placed for purposes of convenience near the primary arrester set. Occasionally, a tertiary stage suppressor has been placed on circuit boards within the electronic control equipment. These prior art systems have been prone to failure, however.

Some failures of prior art surge suppression systems have been attributed to the design of the suppressor of the secondary suppression stage. In the past, these suppressors have had a tendency to short. This short would increase the current in the secondary suppressor to a level that would cause it to heat and "blow open." Thus, an open circuit would result. All of the surge current not absorbed by the primary arrester would then feed to the equipment. On occasion, this has resulted in significant equipment failures. Moreover, time consuming and expensive on site replacement of the suppressors has been required.

SUMMARY OF THE INVENTION

A railway track circuit surge suppression system practicing the present invention utilizes a primary surge suppression stage typically located near the rails and a secondary surge suppression stage typically located near the equipment to be protected. Isolation impedance provided by an interconnecting track line serves to attenuate the surge prior to the secondary surge suppressor. The secondary stage comprises a suppressor generally having a first inductor connected in serial arrangement with one of the track wires of the track line and a second inductor connected in serial arrangement with the other track wire. A zener clamp is connected across the rear of the inductors with respect to the rails. The equipment to be protected is connected behind the clamp.

The secondary suppressor operates to impede the flow of surging current. Specifically, the flow of a surging current appearing at the front end of the inductors will be opposed. This causes the voltage, at this point, to rise to near the transient level. More of the energy is thus urged through the primary stage. The portion of the energy passing to the zener clamp will be easily absorbed.

DETAILED DESCRIPTION

In accordance with the present invention, it has been found that a railway track circuit surge suppression system may be provided which is more effective and reliable than prior art systems. The system incorporates a primary surge suppression stage and a secondary surge suppression stage intermediate a pair of rails and other equipment forming a railway track circuit to protect the equipment from damage caused by transitory energy surges which may appear in the rails. The suppressor of the secondary stage utilizes principles of self-inductance to impede the flow of surge current, thus allowing more of the energy to dissipate at the primary stage.

Figure 1:
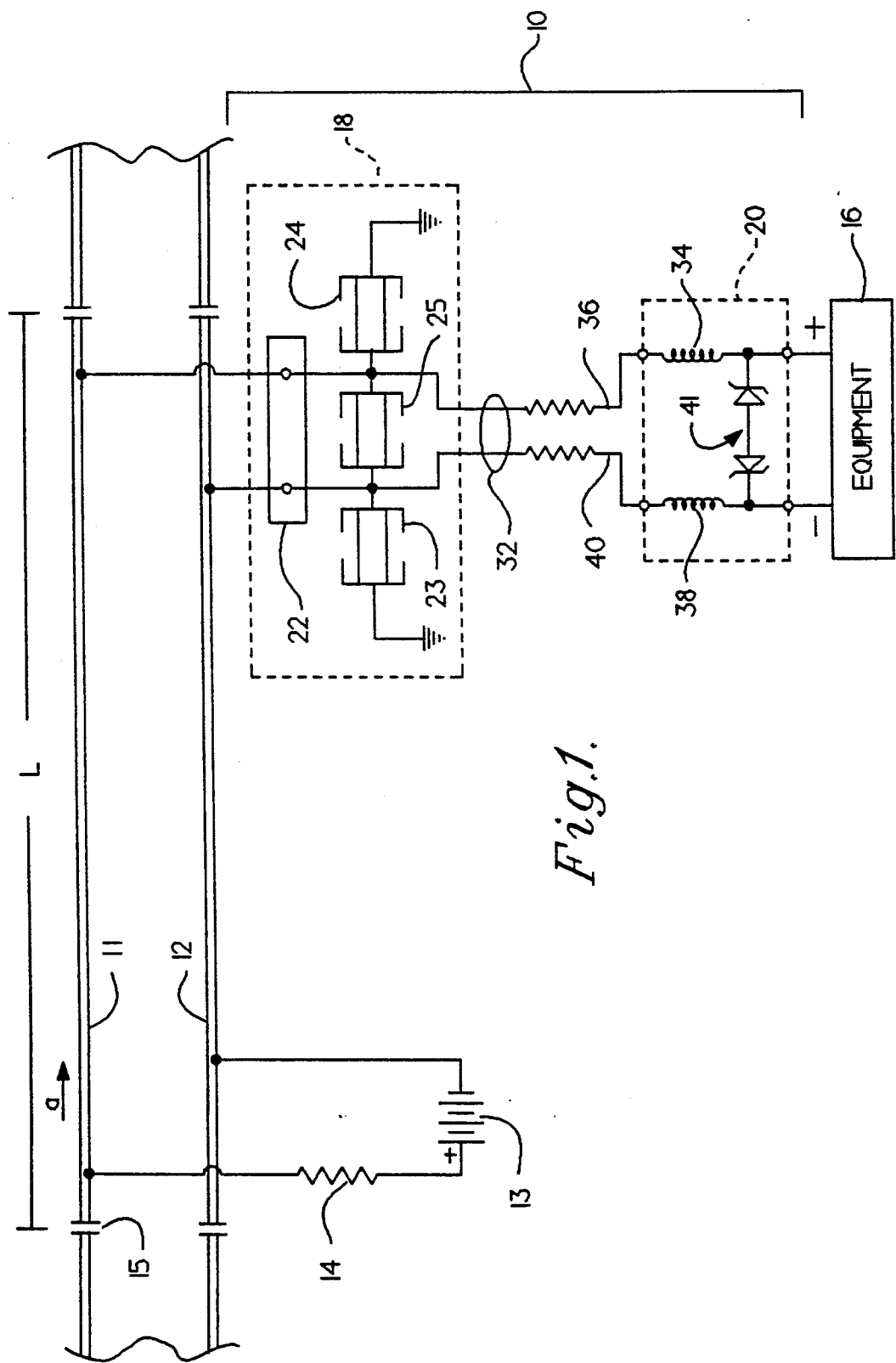
FIG. 1 is a schematic of a railway track circuit illustrating the placement therein of a surge suppression system practicing the present invention.
Figure 2:
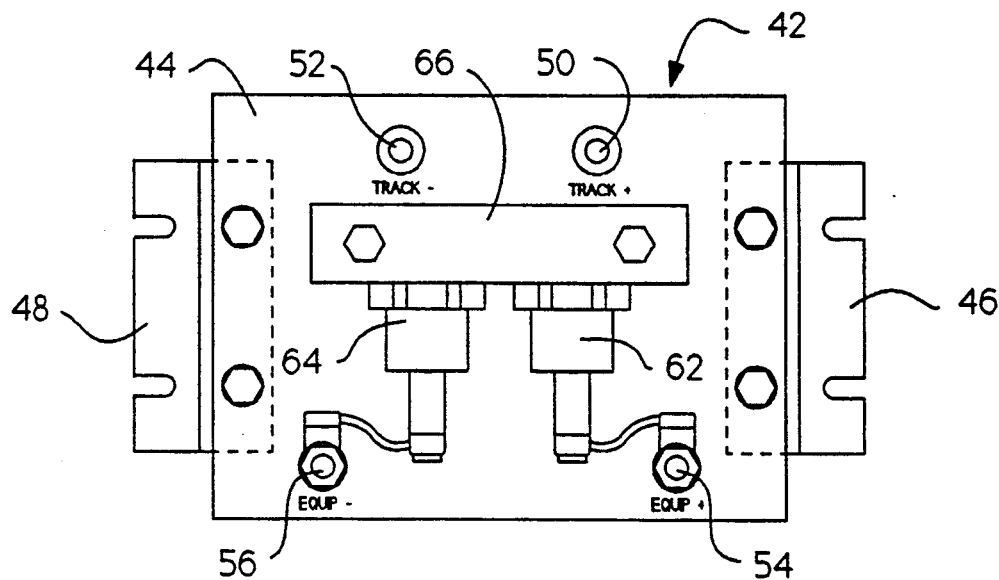
FIG. 2 is a top plan view of a presently preferred embodiment of the secondary surge suppressor of the invention.
Figure 3:
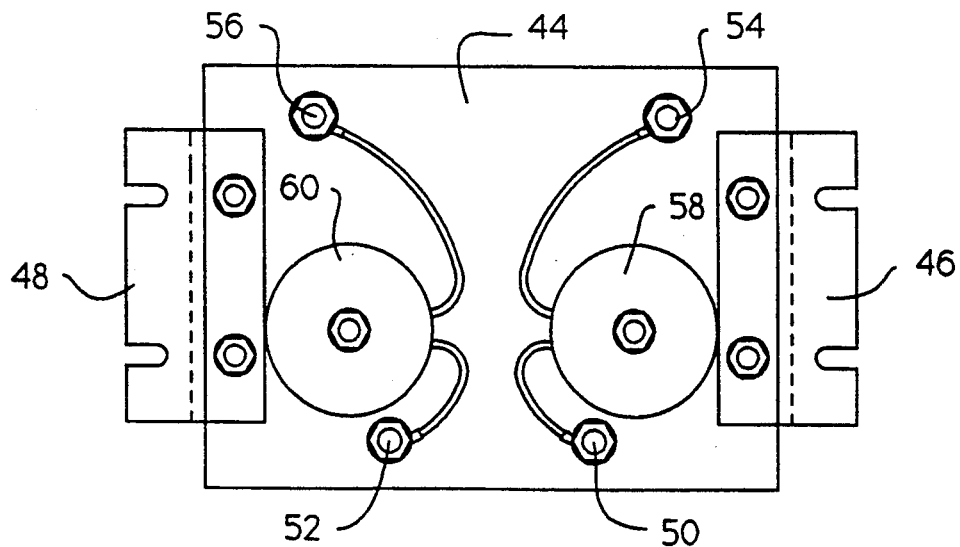
FIG. 3 is a bottom view of the presently preferred embodiment of the secondary surge suppressor of the invention.
Figure 4:
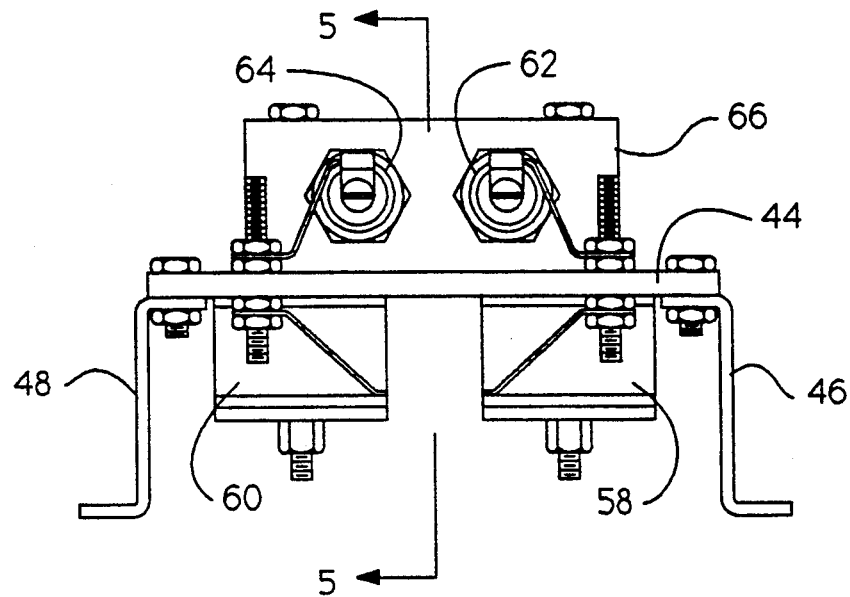
FIG. 4 is an elevation of the presently preferred embodiment of the secondary surge suppressor of the invention.
Figure 5:
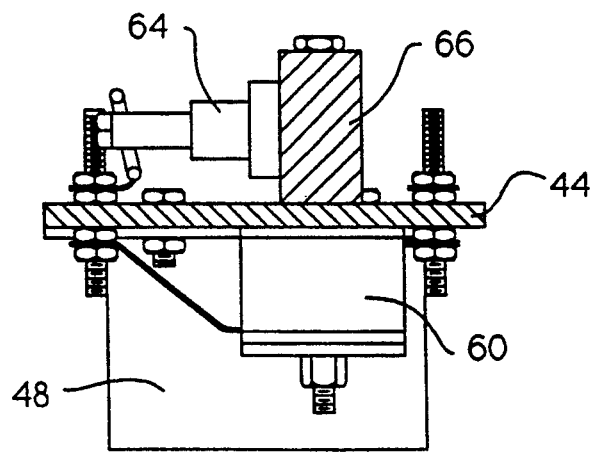
FIG. 5 is a cross-sectional view taken along line 5—5 of FIG. 4.

FIG. 1 illustrates the placement of a presently preferred embodiment of surge suppression system 10 within a railway track circuit. The rails 11 and 12 are used to transmit a signal between a transmitter and a receiver end of the track circuit. In practice, this transmitter will typically be a signal generator. However, the transmitter is shown for purposes of illustration in FIG. 1 as battery 13 and series resistor 14. Resistor 14 can include both the internal resistance of the transmitter and any external resistance, such as current limiting resistors. As is shown, the transmitter is connected across rails 11 and 12. Because of the presence of insulating joints, such as joint 15, current emitted by battery 13 remains in block L and conducts in the direction shown by arrow "a". When the rails 11 and 12 are clear and no state of broken rail exists within block L, the current and any encoded information which it carries are available to operate equipment 16. Equipment 16 typically comprises the electronic switching elements and other circuitry controlling the wayside aspect indicators and may contain transmitter circuitry for the next block.

To prevent a surge of energy such as a lightning surge from damaging equipment 16, system 10 is placed intermediate rails 11 and 12 and equipment 16. System 10 is a multi-stage suppression system. That is, system 10 has a primary suppression stage 18 followed by a secondary suppression stage 20. The primary suppression stage 18 serves to absorb much of a current surge appearing in the rails while the secondary stage will absorb the remainder. Thus, the energy will be dissipated prior to reaching equipment 16. Placement of the various stages within the track circuit is coordinated to maximize surge suppression. Decisions regarding the placement of components of prior art systems were primarily made on the basis of convenience. This has contributed to the relatively high failure rate of these systems.

Primary stage 18 typically comprises an arrester set having line-to-ground arresters 23 and 24 and a line-to-line arrester 25. Preferably, primary stage 18 is placed as close to rails 11 and 12 as practical in order to encounter the energy surge closest to its source. Often, a terminal strip, such as strip 22, has been located adjacent the rails to provide electrical connection between the rails and the wayside equipment. In this situation, one lead of arresters 23 and 24 may be connected directly to terminals mounted on strip 22. Arrester 25 may simply be connected directly across the terminals.

Arresters 23, 24 and 25 are preferably varistor-filled-gap arresters. A varistor, also known as a voltage dependent resistor, is useful in this application because it has a resistance inversely related to the value of the voltage applied across it. In other words, as the voltage rises across it, the arrester will appear more and more as a short circuit. The voltage-current relationship is non-linear, however. At a threshold voltage value, the arrester will "fire" and a large amount of current will flow through it very quickly. U.S. Pat. Nos. 4,237,515 (line-to-line) and 4,237,516 (line-to-ground), incorporated herein by reference, illustrate presently preferred varistor-filled-gap arresters for use in the invention. The threshold voltage for these arresters is approximately 400 volts. It may be preferable in particular applications of the invention, however, to use other arresters or only one line-to-line arrester for primary stage 18.

In the case of electronic switching equipment, the primary arrester has proven inadequate when used alone. A transitory lightning surge is simply too great a magnitude and too short a duration for the arrester to dissipate the energy effectively. Specifically, the varistor-filled-gap arresters are relatively slow in response to transients and their threshold voltage is not closely controlled. Thus, supplementary secondary stage suppressors have been added.

In order for secondary suppression stage 20 to be most effective, it is desirable to place it as near as practical to equipment 16. Thus, an interconnecting track line 32 will provide characteristic isolation impedance to further attenuate the surge. The length of line 32, and consequently this isolation impedance, will vary depending on the exigencies of each installation. Generally, line 32 should be as long as possible without attenuating the encoded track circuit signal to an unusable level. As the length of block L increases, the track circuit signal will be naturally attenuated when reaching the receiver. Thus, at maximum block lengths of approximately 12,000 feet or more, line 32 should be shortest. The typical length of line 32 would be in the range of eight to twenty-two feet. A nine AWG line has been found suitable for use as line 32.

As is shown schematically in FIG. 1, secondary suppression stage 20 comprises an apparatus having a first inductor 34 connected serially between positive track wire 36 of line 32 and a positive terminal of equipment 16. Similarly, second inductor 38 is connected serially between negative track wire 40 of line 32 and a negative terminal of equipment 16. A voltage clamp, such as bipolar zener clamp 41 is connected from the back end of inductor 34 with respect to the rails to the similar back end of inductor 38.

Secondary suppression stage 20 operates to both increase the effectiveness of the primary suppression stage 18 and to further dissipate surge energy. For example, a surge appearing in rail 11 will first encounter arresters 24 and 25. Much of the energy will be dissipated here. However, as explained above, arresters 24 and 25 may be unable to absorb all of the energy and some current will continue to flow through wire 36. The flow of the surge current in secondary suppression stage 20 will be opposed by inductor 34. This will cause the voltage at the front end of inductor 34 to rise to near the transient peak voltage. The voltage rise is communicated back along wire 36 to arresters 4 and 25. As the voltage level at arresters 24 and 24 increases to the threshold, the resistance of the varistor material will drop to a very low value. Thus, a virtual short circuit appears at this point through which much of the surge current will flow. In this way, much of the surge energy is dissipated in primary arrester 18. Most of the remaining current that passes through inductor 34 is simply shorted through bipolar zener clamp 41. Similarly, a surge current appearing in rail 12 is first opposed by inductor 38. Surge current not urged back through arresters 23 and 25 is then shorted through zener clamp 41.

The components of secondary suppression stage 20 should have values which will provide the necessary protective function during periods of energy surge, but will appear generally invisible to the usual track circuit signals. This is desirable so that the presence of the surge suppressors will not disrupt usual track circuit operation. With respect to inductors 34 and 38, it has been found that an inductance value of generally about 100 microHenries is suitable. It is also preferable that inductors 34 and 38 have winding resistances below 50 milliOhms to minimize resistance losses in the windings.

The clamping level of the voltage clamp must be below the level of voltage destructive to equipment 16, but above the voltage of the normal operating signal. The normal operating signal may typically be up to a level of 10 volts peak-to-peak. Breakdown of switching transistors typically utilized in wayside railway equipment, such as equipment 16, generally occurs when a transitory voltage surge exceeds approximately 100 volts. Thus, a clamping level of thirty to forty volts is utilized. This is sufficiently above the signal voltage level while being well below the level of collector-to-emitter breakdown.

FIGS. 2 through 5 illustrate a presently preferred embodiment of a suppressor apparatus 42 for providing secondary suppression stage 20. Apparatus 42 comprises a mounting means, such as mounting plate 44 for maintaining the electrical components in position. Mounting brackets 46 and 48 are attached to mounting board 44 to facilitate placement of apparatus 42, for example, directly upon the housing of wayside equipment to be protected. A first pair of terminals, comprising terminals 50 and 52, provides means for electrically connecting the apparatus to the rails via interconnecting line 32 or the like. A second pair of terminals, comprising terminals 54 and 56, provides means to electrically connect the equipment to be protected.

Brackets 46 and 48 also give clearance to enable the mounting of inductors 58 and 60 beneath mounting board 44. Inductors 58 and 60 correspond to inductors 34 and 38 of FIG. 1, respectively. As can be seen most clearly in FIG. 3, the coil of inductor 58 is wired between positive track terminal 50 and positive equipment terminal 54. Similarly the coil of inductor 60 is wired between negative track terminal 52 and negative equipment terminal 56.

The cathodes of diodes 62 and 64, which correspond to bipolar zener clamp 41 of FIG. 1, are connected between positive equipment terminal 54 and negative equipment terminal 56. The anodes of diodes 62 and 64 are connected together. Although most surge current will be arrested prior to reaching diodes 62 and 64, the amount of current which will pass through diodes 62 and 64 will still be greater than the capacity of a typical semi-conductor diode. Thus, in order to prevent zener clamp 41 from being destroyed by resistive heat, it is necessary to provide diodes with a relatively large junction area. Based on the anticipated environment, diodes 62 and 64 should have the capacity to handle approximately 30 joules of energy. Diode part number 300Z34.5B manufactured by International Rectifier has been found to have this capacity. This diode has a junction with a circular cross-section having a diameter larger than conventional zener diodes. While diodes with somewhat lower energy capacities may be used, the survival rating of the suppressor may be diminished. This would result in a greater necessity for expensive on-site replacement.

Additionally, the diodes are preferably mounted on a heat sink. A metallic member, such as aluminum block 66, is suitable for this purpose. In addition to providing a convenient mounting scheme for diodes 62 and 64, block 66 operates to provide very effective heat dissipation. During a lightning storm, for example, diodes 62 and 64 could clamp several hundred transient spikes. This could raise the instantaneous junction temperature to destructive levels. However, the heat sinking properties of block 66 conduct the heat away quickly enough to prevent destruction.

Figure 6:
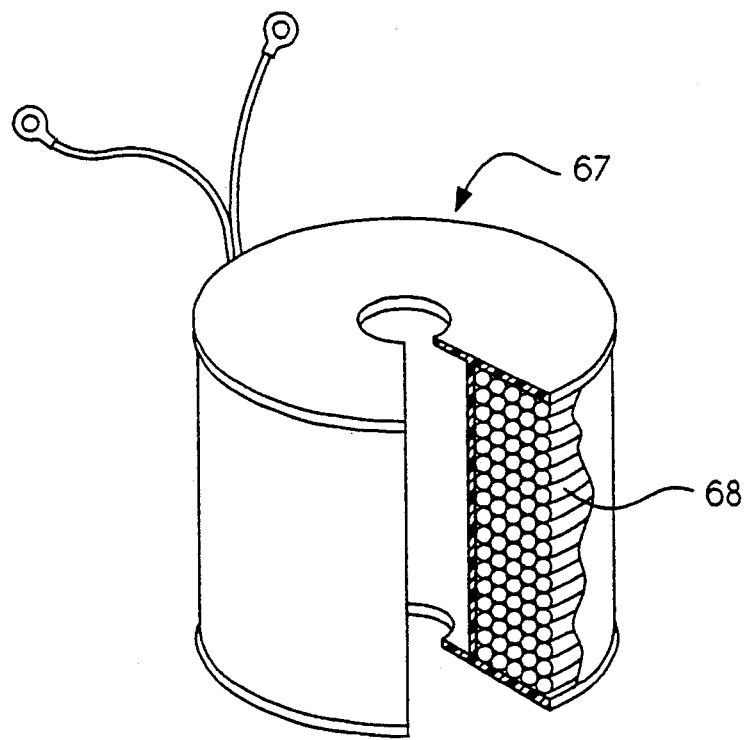
FIG. 6 is a perspective view, in partial section, of a presently preferred inductor of the secondary surge suppressor.
Figure 6A:
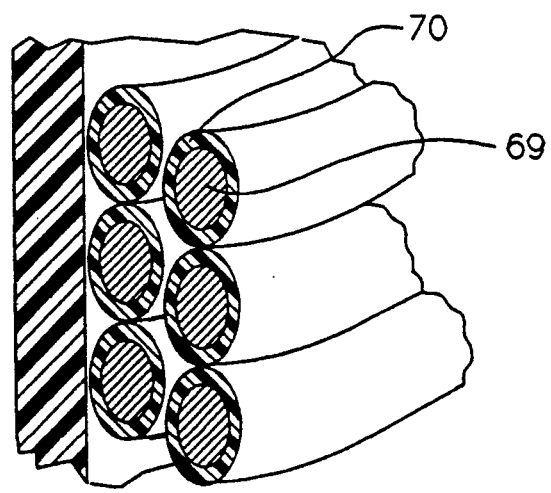
FIG. 6A is a fragmentary view of a portion of the inductor winding illustrating the polymeric varnish insulation thereon.

Inductors 58 and 60 also have certain unique characteristics to increase their effectiveness. FIGS. 6 and 6A illustrate these features. Inductor 67, identical to inductors 58 and 60, is preferably of an air core design. This is to prevent core saturation in view of the relatively large currents that will be passing through the coil 68. In order to keep the resistance of coil 68 below the acceptable threshold level, coil 68 is constructed of heavy gauge wire, such as twelve AWG wire, reference 69. Twelve gauge wire 69 gives the coil a DC resistance of approximately 43 milliOhms. Also, interwinding capacitance is minimized. Thus, apparatus 42 will introduce minimal insertion losses so as not to disrupt with the normal track circuit signal.

During a period of energy surge, very large voltages will arise at the front end of the inductors. This will result in high concomitant turn to turn (or winding-to-winding) voltages within coil 68. These high voltages can cause typical insulating materials to break down, resulting in apparatus failure. To overcome this problem, coil wire 69 is coated with a polymeric varnish insulation which is highly resistant to heat breakdown. In the presently preferred embodiment, coil wire 69 has an Essex Thermetex GP-200 Heavy Build varnish insulation 70. Since the varnish insulation resists winding-to-winding breakdown, survivability of the apparatus 42 is further augmented. With this type of varnish insulation, it is important that coil 68 have a radius of bend such that the varnish will not crack. In view of the preferred circuit parameters, a mean bend radius of approximately 0.75 inches has been found suitable.

It can thus be seen that an improved railway track circuit surge suppression system has been provided. The secondary surge suppression apparatus of the invention is at once more reliable and survivable than the prior art. Although certain preferred embodiments have been described and shown herein, it is to be understood that various other embodiments and modifications can be made within the scope of the following claims.

I claim:

1. A railway track circuit surge suppression system for electrical connection intermediate a pair of rails and other equipment forming a track circuit to protect said equipment from damage caused by transitory energy surges in the rails, said system comprising the combination of:
   a primary surge suppression stage placed generally adjacent to said rails, said primary surge suppression stage having at least one varistor-filled-gap arrestor;
   an interconnecting line of characteristic impedance having a length extending from said primary surge suppression stage to a secondary surge suppression stage, said interconnecting line having a first and second track wire;
   said secondary surge suppression stage placed generally adjacent said equipment and having a first inductor of an inductance of generally 100 microhenries and a resistance of less than 0.050 ohms and connected between said first track wire and a positive terminal of said equipment, a second inductor of an inductance of generally 100 microhenries and a resistance of less than 0.050 ohms and connected between said second track wire and a negative terminal of said equipment, and a zener clamp attached to a heat sink and electrically connected behind said inductors with respect to said rails, said zener clamp capable of conducting at least thirty joules of energy without sustaining damage; and
   said length of said interconnecting line being generally greater than eight feet.

2. The railway track circuit surge suppression system of claim 1 wherein said length of said interconnecting line is generally in the range of 8 to 22 feet.

3. The railway track circuit surge suppression system of claim 2 wherein said first and second track wires are each size number 9 American wire gauge, and further wherein said first and second inductors comprise air core windings having a mean bend radius of approximately 0.75 inches and are constructed having a polymeric varnish insulation thereon.

* * * * *